US008650357B2

(12) United States Patent
Lord

(10) Patent No.: US 8,650,357 B2
(45) Date of Patent: Feb. 11, 2014

(54) PREVENTING READ WHILE WRITING OCCURRENCES

(76) Inventor: Stephen P. Lord, Prior Lake, MN (US)

( * ) Notice: Subject to any disclaimer, the term of this patent is extended or adjusted under 35 U.S.C. 154(b) by 254 days.

(21) Appl. No.: 13/237,136

(22) Filed: Sep. 20, 2011

(65) Prior Publication Data

US 2013/0073804 A1 Mar. 21, 2013

(51) Int. Cl.
*G06F 12/00* (2006.01)
(52) U.S. Cl.
USPC .............. 711/112; 711/154; 711/E12.001
(58) Field of Classification Search
USPC ............................. 711/112, 154, E12.001
See application file for complete search history.

(56) References Cited

U.S. PATENT DOCUMENTS

2008/0162811 A1* 7/2008 Steinmetz et al. ............ 711/114

* cited by examiner

*Primary Examiner* — Mardochee Chery

(57) ABSTRACT

Example apparatus and methods concern controlling a computer to prevent read while writing occurrences in direct output. One example method includes identifying a non-conformance between a block of data intended to be output using direct output and a desired direct output block. Conventionally, the non-conformance would cause the computer to perform a read operation to provide additional data suitable for conforming the block of data to the desired direct output block. Once the method has identified the non-conformance, the method may prevent the computer from performing the read operation. The method may also control the computer to perform an additional output operation to make the block of data appear to conform to the desired direct output block. The additional output operation will be performed without performing a read operation. In one embodiment, the method is performed in the kernel of an operating system running on the computer.

21 Claims, 4 Drawing Sheets

PREVENTING READ WHILE WRITING OCCURRENCES

BACKGROUND

Computers, computer operating systems, computer file systems, computer storage devices, and other computerized items may prefer to communicate using standard, fixed size blocks of data. For example, storage devices may require access to be in multiples of a pre-determined fixed block size and may only be addressable at block boundaries. File systems generally organize storage as a set of fixed size units. The file system may be helped by an operating system that may also prefer to write data using the pre-determined, fixed block size. Write efficiency in these systems can be negatively impacted when the data supplied by the application to be written does not completely fill the fixed sized block. The inefficiency arises because a file system or other actor may be forced to "fill in the gaps" in the write with additional data that may, unfortunately, be acquired by doing a read operation. Doing a read(s) as part of a write may be inefficient due to additional device latencies introduced.

Computer input/output (i/o) may be performed using buffered i/o. Computer i/o may also be performed using direct i/o. In buffered i/o, data to be written by a file system write may be buffered or cached in the operating system. Buffering the write provides opportunities to improve efficiencies by, for example, re-arranging write orders to achieve more sequential i/o to devices, re-ordering data to be written to reduce assembly issues on a receiving side, reducing the likelihood that blocks are repeatedly written, and so on. In direct i/o, data to be written by a file system write goes directly to a storage device and bypasses file system buffer caches in an operating system.

In a buffered output system, where there is a cache into which data to be written can be temporarily stored before being written, the read during write inefficiency may be addressed by aggregating the output of multiple writes in the cache. However, in a direct output environment, where there is no output cache in which padding or initialization approaches can be performed, it may be difficult, if even possible at all, for conventional systems to avoid the read during write occurrence and the resulting inefficiency in all situations.

FIG. 1 illustrates four situations including a block 100 that is completely filled with data, a block 110 having a gap 112 at its end, a block 120 having a gap 122 at its beginning, and a block 130 having a gap 132 at its beginning and a gap 134 at its end. In a conventional file system with conventional pre-write caching, gaps may be filled by the file system or by the operating system or by some other actor so that a full block is prepared and written. In one example, the padding may simply be null values (e.g., zeroes). In other examples, unfortunately, the padding may be other live data. Packaging two or more pieces of unrelated data into a single block may create new issues even while minimizing the read during write inefficiency. These packaging issues may complicate and/or compromise some processing (e.g., parity calculations) associated with redundant arrays of independent disks (RAID).

In a conventional direct i/o system, where there is no pre-write caching, the gaps may also be filled by a file system or by an operating system or by some other actor. Unfortunately, the gap filling may include performing a read operation to find data to fill the gap. Performing a read(s) during a write operation can significantly slow down the write operation. This may be particularly onerous during a read modify write cycle in RAIDs where the size of the block becomes very large in relation to the typical file i/o size.

Occasional write inefficiency may be more acceptable than lengthy, complicated, efforts to reduce inefficiency that may introduce more inefficiencies than they resolve. However, the combination of certain files and certain applications in certain environments may create conditions that cause the read during write inefficiency to occur at an unacceptable frequency. For example, some files (e.g., video files) have grown to large sizes and continue to grow even as very demanding applications (e.g., video capture) make ever increasing use of these large files in increasingly demanding environments (e.g., shared disk file system). Additionally, video capture can create issues. Video capture is now frequently performed using individual frame files rather than large media files that represent a whole movie or scene. The individual frame files have a data size governed by the video format. The individual frame files are rarely complete file system block multiples, and are practically never a complete RAID stripe multiple. By allocating files next to each other, and by filling in the portion of the allocated space that was not provided by the user, large amounts of sequential data can be written. This facilitates making the individual smaller files efficient for the RAID to perform parity calculations on.

Some files are input and output (e.g., read, written) in conventional known ways that produce a knowable or at least predictable context for a file. This context allows past behavior to predict future behavior, which facilitates addressing some i/o inefficiencies. However, large video files tend to be accessed in ways that do not produce predictable contexts. Thus, the combination of large file size and non-contextual usage may have frustrated conventional i/o optimization strategies. Even worse, some video files may be written in ways that frequently generate less than full block i/o. Therefore, the combination of large file size, non-contextual usage, and demanding applications that produce less than full block i/o may increase the frequency of read during write operations and consequently negatively impact i/o efficiency.

This situation may be further exacerbated due to direct i/o performed by specialized file systems. A conventional file system may use a cache and may perform a limited amount of i/o on a limited number of files over a period of time. However, a shared disk file system that facilitates sharing large files among many users who may all have different access times and/or approaches may face a more challenging task. This type of shared disk file system may deal with very large amounts of data (e.g., an entire file system backup, an entire file system replication, streaming a large number of movies to a large number of users) that could overwhelm a conventional cache based system. Since a conventional cache based system may be overwhelmed in this environment, direct i/o may be employed. However, as described above, direct i/o can be negatively impacted by read during write occurrences. The frequency of read during write occurrences may increase beyond a desired threshold when large, non-contextual video files are either present in or dominate the data being handled via direct i/o in a shared disk file system. The read during write issue may exist at different levels. At one level, the file system may need to issue a read to initialize parts of a block. At another level, a RAID system may need to issue an internal device read to complete a parity calculation because the file system did not supply a complete raid stripe worth of content. Example systems and methods address both levels.

When writing more than a single block of data, it may be desirable to do sequential i/o to reduce and/or minimize write head movement and thus to reduce and/or minimize write time. Performing a read during a sequential write could negatively impact many of the reasons for performing sequential i/o, with the damage becoming greater as the number of potential consecutive writes grows larger. Applications like replication, de-duplication, and tiered archival storage that run on shared disk file systems may generate a large volume of sequential i/o. However, these types of applications may also produce a large volume of efficiency destroying read during write occurrences. Similarly, video ingest applications may generate a large volume of sequential i/o as movies are scanned. Video ingest may produce a large volume of efficiency destroying read during write occurrences because, in some examples, video frames may not always match block sizes and will rarely, if ever, supply a complete RAID stripe worth of content.

Thus, there are significant read during write issues associated with actors that are performing writes. However, read during write occurrences may also occur at a storage device that receives less than a complete block of data. Consider RAID devices that may seek to perform operations like parity computations on fixed size pieces of data. If a RAID device is provided with less than a fixed size piece of data, then the RAID device may perform a read during its parity computation as part of its write to fill in its gaps. As described above, buffered i/o may not experience these read during write occurrences. Even if buffered i/o is available in a file system, there may still be read during write issues associated with RAID unless a file system can fill a whole RAID stripe before having to write the RAID's cache.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
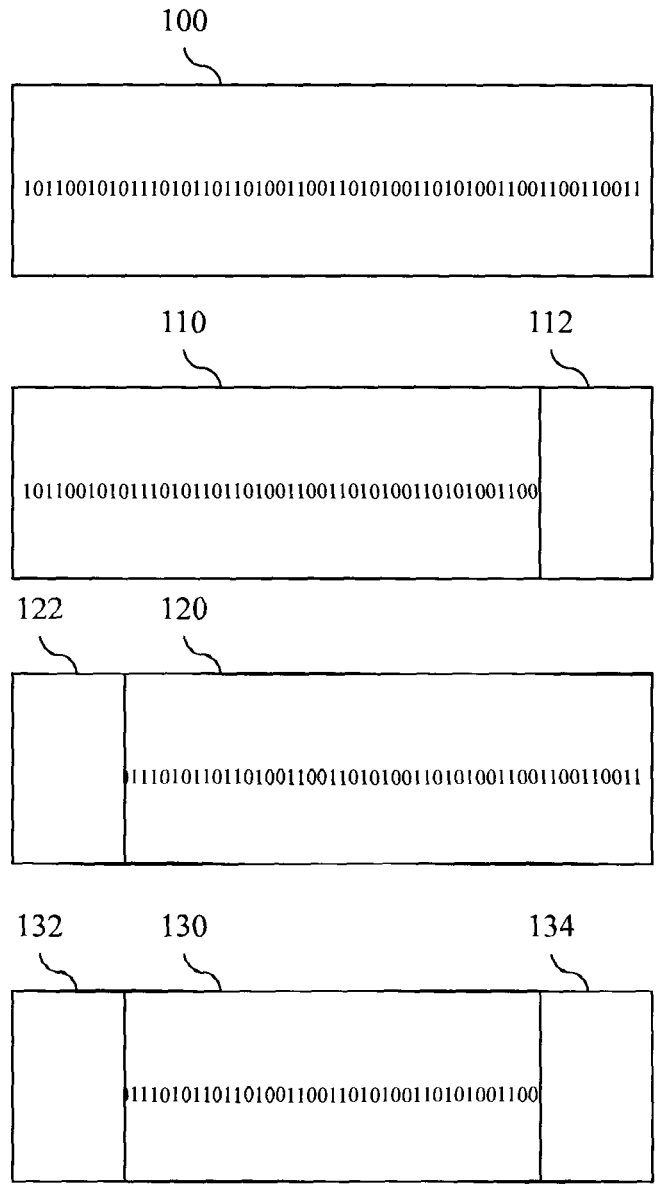
FIG. 1 illustrates complete and incomplete data blocks.

Example apparatus and methods detect an impending read during write occurrence. Example apparatus and methods may then prevent the read during write occurrence. Example apparatus and methods may also perform an additional output or outputs to remedy the situation that created the impending and now prevented read during write occurrence. The additional output will be performed without doing an input. In one embodiment, an input/output (i/o) logic and/or process can be tasked with doing output from an apparatus to a data storage device. In one embodiment, the i/o logic and/or process may be configured to detect and prevent read during write occurrences. A file system may participate in direct i/o. In one embodiment, example apparatus and methods concern a file system that is configured to detect, prevent, and remedy read during write operations. An operating system may also participate in direct i/o. In one embodiment, example apparatus and methods concern an operating system that is configured to detect, prevent, and remedy read during write operations. In one embodiment, the detection, prevention, and/or remedying may be performed by an operating system kernel. Specialized direct i/o hardware may also participate in direct i/o. In one embodiment, example apparatus and methods concern specialized direct i/o hardware configured to detect, prevent, and remedy read during write operations. Remedying a read during write operation may include causing an additional output to be performed to "fill out" an output that would otherwise produce a read during write. The "filling out" is done without doing an additional read operation. The "filling out" may be done at different levels including, for example, filling out a file system block, and filling out a RAID stripe. The filling out may include writing zeroes around user-supplied data.

Some portions of the detailed descriptions that follow are presented in terms of algorithms and symbolic representations of operations on data bits within memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
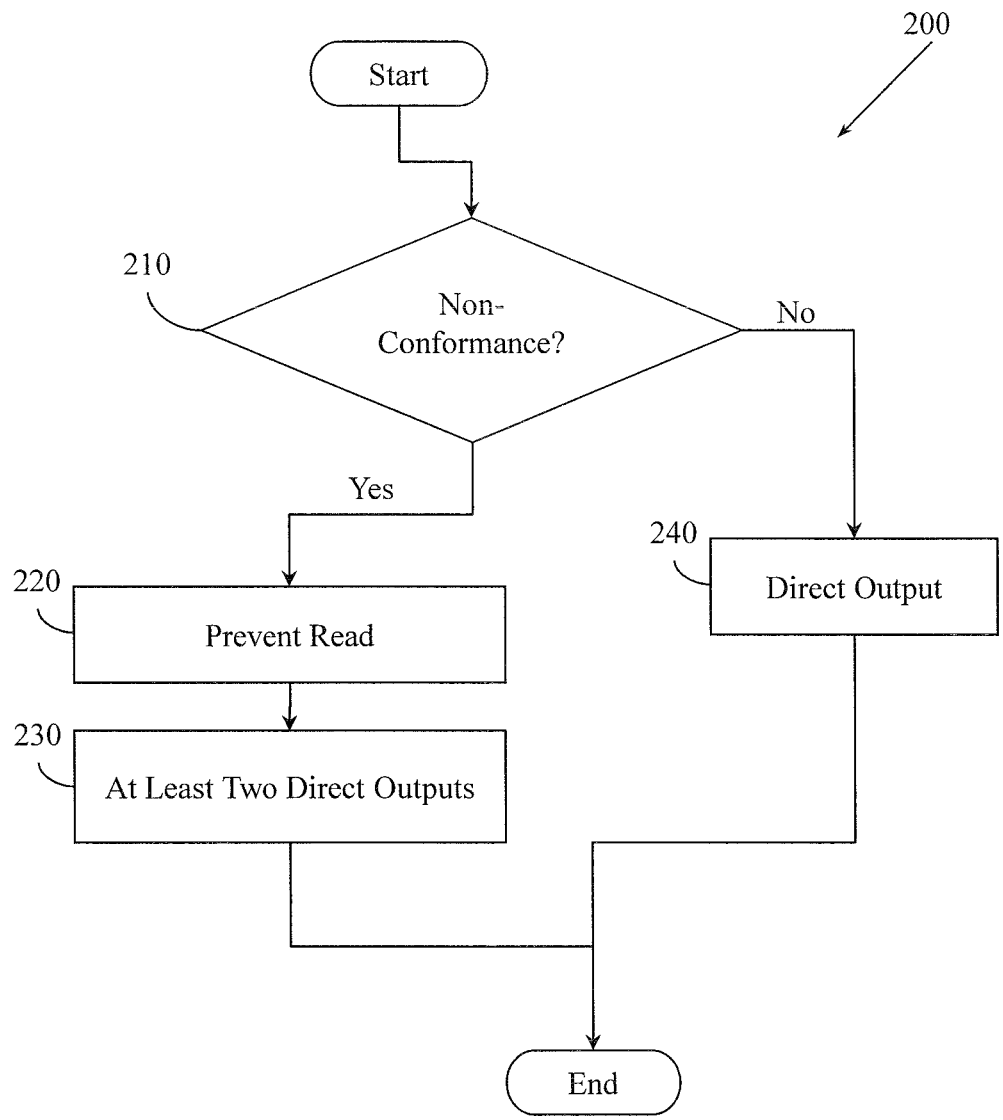
FIG. 2 illustrates a method associated with preventing read while writing occurrences.

FIG. 2 illustrates a method 200 associated with preventing read while writing occurrences. Method 200 includes, at 210, determining whether a non-conformance exists between two blocks of data. One of the blocks of data is a block that is intended to be output to a data storage device using direct i/o. Another of the blocks is a model or desired direct output block. In one example, the second block of data is an actual block of data. In another example, the second block of data is not an actual block of data but may be, for example, a description of a data block, a set of rules for a data block, or other information to which the block of data to be output can be compared or measured. The description may concern, for example, the size of a desired direct output block, continuity requirements for a desired direct output block, exclusivity requirements for data in a desired direct output block, and so on.

There may be different types of non-conformances that may be identified as being non-conformances that would cause the computer to perform a read operation to provide additional data suitable for conforming the block of data to the desired direct output block. In one example, the non-conformance may concern the block of data being smaller than a desired direct output block size. In another example, the non-conformance may concern the block of data having a gap that is unworkable for the desired direct output block. Since there may be more than one reason why there may be a non-conformance, the read operation that is blocked may have been configured to acquire data to add to the block of data to be output to make it bigger, to acquire data to fill in gaps in the block of data, and so on.

If a non-conformance is identified at 210, then processing proceeds to 220, otherwise, if no non-conformance is identified, processing can proceed to 240 where normal direct i/o may be performed. Actions performed at 220 may be limited to blocks of data having a boundary portion that is newly allocated and that does not contain existing data that is to be preserved.

Actions performed at 220 may include preventing the computer from performing the read operation. Preventing the computer from performing the read operation may include, for example, delaying a direct output of the block of data, not forwarding the block of data from one entity in an output path to another entity in the output path, identifying an additional output operation that can be performed to block the read, transferring control from a first device driver to a second device driver, transferring control within a device driver, transferring control from a first portion of an operating system to a second portion of an operating system, transferring control from a first portion of an operating system kernel to a second portion of an operating system kernel, and so on.

Method 200 also includes, at 230, controlling the computer to perform at least two direct output operations. The at least two direct output operations may include a direct output of the block of data and an additional output operation to make the block of data appear to conform to the desired direct output block. Since the block of data may be "missing" data at the beginning, at the end, or even somewhere in the interior of the block, the additional output operation may be performed before outputting the block of data, after outputting the block of data, in between outputting portions of the block of data, and so on.

Controlling the computer to perform the at least two direct output operations at 230 may be performed by different actors. The actors may include, for example, an operating system running on the computer, an operating system supporting the computer, an operating system interacting with the computer, an operating system kernel running on the computer, an operating system kernel supporting the computer, an operating system kernel interacting with the computer, an operating system component operating on the computer, an operating system component supporting the computer, an operating system component interacting with the computer, a device driver running on the computer, a file system operating on the computer, a file system supporting the computer, a file system interacting with the computer, a file system component running on the computer, a file system component supporting the computer, a file system component interacting with the computer, and/or by direct output hardware associated with the computer. The direct output hardware may take the form, for example, of an output adapter, or an output circuit. In different examples the direct output hardware may be retro-fitted onto an existing adapter or may replace an existing adapter. In one embodiment, the file system component may be part of a shared disk file system.

In one example, the data storage device may be configured to operate as a member of a storage area network (SAN). In another example, the data storage device may be configured to operate as a member of a shared disk file system. The shared disk file system may be associated with an application that processes extremely large amounts of data associated with, for example, backing up an enterprise, providing replication for an enterprise, providing de-duplication for an enterprise, and so on. A shared disk file system may run on several hosts that are connected to the same disk array in a storage area network (SAN). One example application that illustrates how read during write operations could occur involves a shared disk file system that is simultaneously supporting sharing large files without delays (e.g., satellite images for real-time mapping) and providing on-demand video serving where users can start their on-demand viewing at a time and place of their choosing. As described above, capturing video files may be prone to producing read while writing conditions. Thus, in one example, method 200 may handle blocks of data that are associated with a video file that has exhibited non-contextual input/output while being served by a computer participating in a shared network file system operating in a storage area network.

While FIG. 2 illustrates various actions occurring in serial, it is to be appreciated that various actions illustrated in FIG. 2 could occur substantially in parallel. By way of illustration, a first process could identify non-conformances, a second process could block impending read during write operations, and a third process could perform direct i/o associated with the block to be output and with making the block to be output appear to conform to a desired direct output block. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform methods described herein including method 200. While executable instructions associated with the above method are described as being stored on a computer-readable medium, it is to be appreciated that executable instructions associated with other example methods described herein may also be stored on a computer-readable medium.

For example, in one embodiment, the method may include accessing a block of data associated with a video file that has exhibited non-contextual input/output while being served by a computer participating in a shared network file system operating in a storage area network. The method may also include determining that the block of data intended to be output to a data storage device using direct output will cause the computer to perform a read operation to provide additional data suitable for conforming the block of data to a direct output protocol. Once the determination has been made that a read during write operation would occur, the method includes preventing the computer from performing the read operation, and controlling the computer to perform an additional output operation to make the block of data appear to conform to the desired direct output protocol. The data storage device may be configured to operate as a member of a shared disk file system operating in a storage area network. The block of data may be identified as causing the computer to cause the read during write operation because the block of data is smaller than a block size desired by the direct output protocol. Controlling the computer to perform the additional output operation may be performed in the kernel of an operating system running on the computer.

Figure 3:
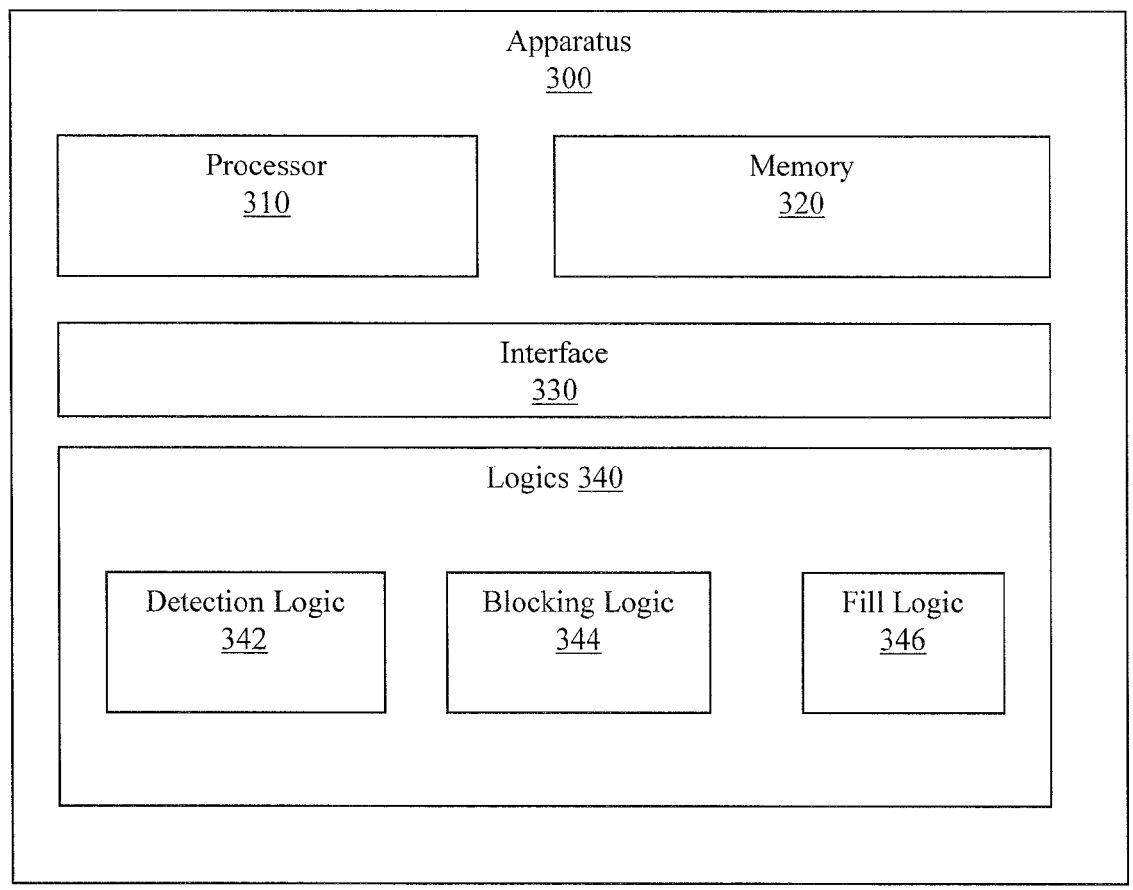
FIG. 3 illustrates an apparatus associated with preventing read while writing occurrences.

FIG. 3 illustrates an apparatus 300 associated with preventing read while write occurrences. Apparatus 300 includes a processor 310, a memory 320, a set 340 of logics and an interface 330 to connect the processor 310, the memory 320, and the set 340 of logics. The set 340 of logics may include a detection logic 342, a blocking logic 344, and a fill logic 346.

In one embodiment, the detection logic 342 may be configured to detect an impending read during write operation. Detection logic 342 may detect the impending read during write operation by comparing a data block to be output using direct output to a desired direct output block. The desired direct output block may be a real block of data or may be described by rules, parameters, and other information. In one embodiment, the detection logic 342 is configured to detect the impending read during write operation by comparing the amount of data in the data block to be written to the size of the desired direct output block. In another embodiment, the detection logic 342 is configured to detect the impending read during write operation by comparing the continuity of data in the data block to a desired continuity associated with the desired direct output block. While size and continuity are described, other mismatches between a block to be written using direct i/o and a desired direct i/o protocol may trigger a read during write operation and thus trigger actions of the blocking logic 344 and/or the fill logic 346.

In one embodiment, the blocking logic 344 may be configured to control the apparatus 300 to not perform the impending read during write operation. Exercising this control may include, for example, delaying a direct output of the block of data, not forwarding the block of data from one entity in a direct output path to another entity in the direct output path, identifying an additional output operation that can be performed to block the read, transferring control from a first device driver to a second device driver, transferring control within a device driver, transferring control from a first portion of an operating system to a second portion of an operating system, transferring control from a first portion of an operating system kernel to a second portion of an operating system kernel, and so on.

In one embodiment, the fill logic 346 may be configured to control the apparatus 300 to perform an additional output to conform the data block to the desired direct output block. The additional output may provide data that makes the data block appear to be a complete block that matches desired direct i/o parameters. In one embodiment, the additional output may add data after the direct i/o of the data block to make a smaller data block appear to be a complete data block. In another embodiment, the additional output may add data before the direct i/o of the data block to make a smaller data block appear to be a complete data block. In yet another embodiment, additional outputs may add data both before and after the direct i/o of the data block to make a smaller data block appear to be a complete data block. In different embodiments, different numbers of additional outputs that provide different amounts of data may be performed before, in conjunction with, or after the direct i/o of the data block. The additional outputs may be zeroes that are written around the data block of user supplied data.

In different embodiments, the detection logic 342, the blocking logic 344, and the fill logic 346 may reside in different locations including, but not limited to, a file system operating on the apparatus 300, an operating system operating on the apparatus 300, an operating system kernel operating on the apparatus 300, and direct output hardware associated with the apparatus 300. In different embodiments, the detection logic 342, the blocking logic 344, and the fill logic 346 may all be located in one location (e.g., operating system kernel) or may be distributed between locations (e.g., operating system kernel, operating system, direct output hardware). Different combinations and arrangements are possible.

Figure 4:
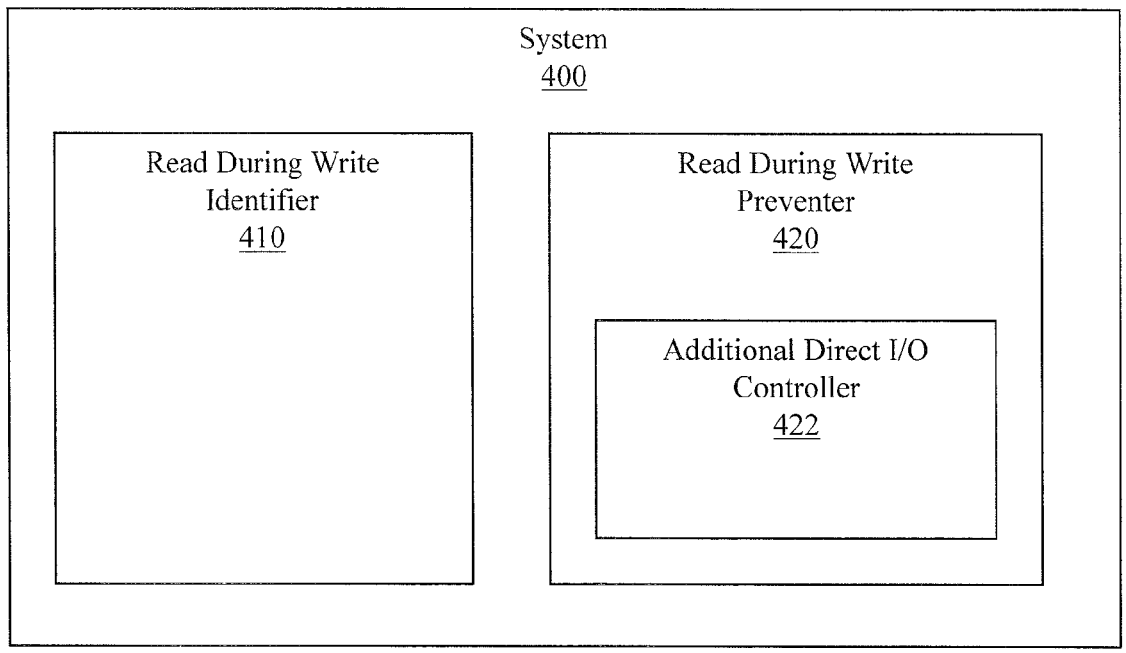
FIG. 4 illustrates a system associated with preventing read while writing occurrences.

FIG. 4 illustrates a system 400 associated with preventing read operations during direct output data operations. System 400 includes means 410 for identifying a direct output data operation that will produce a read operation during the direct output data operation. In one embodiment, means 410 may be a portion of an operating system kernel that is configured to perform direct i/o where file system data is not buffered in an operating system cache(s). Since the file system data is not buffered, the opportunity to perform buffer based approaches (e.g., pre-initialization, padding) may not be available. The read during write identifier 410 may determine that a read during write is about to occur because less than a complete block of data is about to be output using direct output. In one embodiment, the determination may be made while the data is being output. For example, the amount of data output during a direct output operation may be tracked and when the output completes without a full data block having been transmitted the means 410 may identify this situation. Conventionally, this situation may lead to a read occurring to find additional data to output to fill up the block. However, that read can be inefficient.

Therefore, system 400 also includes means 420 for preventing the read operation during the direct output data operation. In one example, the read during write preventer 420 may prevent the read operation by performing an additional output operation associated with the direct output data operation instead of performing a read to find data. The read during write preventer 420 may be configured to receive an interrupt that would otherwise trigger a read. In one embodiment, the interrupt may be handled by a device driver or a portion of an operating system kernel. In another embodiment, the interrupt may be provided to dedicated circuitry (e.g., additional direct i/o controller 422) that knows how much additional data needs to be output to complete a direct output block. In one embodiment, the additional output operation may simply output enough null values (e.g., 0x00) to make the amount of data output look like a complete direct output block.

While an operating system kernel embodiment is described for means 410 and means 420, other structure including circuitry on an output adapter may be employed for means 410 or means 420.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method for controlling a computer to prevent read while writing occurrences, comprising:
   identifying a non-conformance between a block of data and a desired direct output block, where the block of data is intended to be output using direct output to a data storage device, and where the non-conformance will cause the computer to perform a read operation to provide additional data suitable for conforming the block of data to the desired direct output block, and
   upon identifying the non-conformance:
     preventing the computer from performing the read operation, and
     controlling the computer to perform at least two direct output operations including a direct output of the block of data and an additional output operation to make the block of data appear to conform to the desired direct output block.

2. The method of claim 1, where the non-conformance comprises the block of data being smaller than the size of the desired direct output block.

3. The method of claim 2, where the read operation that is prevented is a read operation configured to conform the size of the block of data to the size of the desired direct output block.

4. The method of claim 1, where the non-conformance comprises the block of data having a gap that is not desired in the desired direct output block.

5. The method of claim 4, where the read operation that is prevented is a read operation configured to conform the block of data to the desired direct output block by filling the gap.

6. The method of claim 1, where controlling the computer to perform the additional output operation is performed by one of, an operating system supporting the computer, and an operating system kernel supporting the computer.

7. The method of claim 1, where the additional output operation includes writing zeroes around the direct output of the block of data.

8. The method of claim 1, where controlling the computer to perform the additional output operation is performed by one of, a file system supporting the computer, and direct output hardware associated with the computer.

9. The method of claim 1, where the additional output operation is limited to a newly allocated boundary portion of the data block that does not contain existing data to be preserved.

10. The method of claim 1, where the block of data is associated with a video file that has exhibited non-contextual input/output.

11. The method of claim 1, where the data storage device is configured to operate as a member of a storage area network.

12. The method of claim 1, where the data storage device is configured to operate as a member of a shared disk file system.

13. An apparatus, comprising:
    a processor;
    a memory;
    a set of logics; and
    an interface configured to connect the processor, the memory, and the set of logics, the set of logics comprising:
- a detection logic configured to detect an impending read during write occurrence by comparing a data block to be output using direct output to a desired direct output block;
- a blocking logic configured to control the apparatus to not experience the impending read during write occurrence; and
- a fill logic configured to control the apparatus to perform an additional output to make the data block appear to conform to the desired direct output block.

14. The apparatus of claim 13, where one or more of the detection logic, the blocking logic, and the fill logic reside in a file system configured to interact with the apparatus.

15. The apparatus of claim 13, where one or more of the detection logic, the blocking logic, and the fill logic reside in one of, an operating system configured to interact with the apparatus, and an operating system kernel configured to interact with the apparatus.

16. The apparatus of claim 13, where the additional output includes writing zeroes around user supplied data in the direct output block.

17. The apparatus of claim 13, where one or more of the detection logic, the blocking logic, and the fill logic reside in direct output hardware configured to interact with the apparatus.

18. The apparatus of claim 13, where the detection logic is configured to detect the impending read during write occurrence by comparing the amount of data in the data block to the size of the desired direct output block.

19. The apparatus of claim 13, where the detection logic is configured to detect the impending read during write occurrence by comparing the continuity of data in the data block to a continuity associated with the desired direct output block.

20. A system, comprising:
- means for identifying a direct output data operation that will produce a read operation during the direct output data operation; and
- means for preventing the read operation during the direct output data operation by performing an additional output operation associated with the direct output data operation.

21. A non-transitory computer-readable medium storing computer-executable instructions that when executed by a computer cause an operating system kernel to perform a method, the method comprising:
- accessing a block of data associated with a video file that has exhibited non-contextual access while being served by a computer participating in a shared network file system operating in a storage area network; and
- upon determining that the block of data intended to be output to a data storage device using direct output will cause the computer to perform a read operation to provide additional data suitable for conforming the block of data to a direct output protocol:
  - preventing the computer from performing the read operation, and
  - controlling the computer to perform an additional output operation to make the block of data appear to conform to the desired direct output protocol,
- where the data storage device is configured to operate as a member of a shared disk file system operating in a storage area network,
- where the block of data will cause the computer to perform the read operation because of the block of data is smaller than a block size desired by the direct output protocol, and
- where controlling the computer to perform the additional output operation is performed in the kernel of an operating system running on the computer.

* * * * *

UNITED STATES PATENT AND TRADEMARK OFFICE
CERTIFICATE OF CORRECTION

| | | |
|---|---|---|
| PATENT NO. | : 8,650,357 B2 | Page 1 of 1 |
| APPLICATION NO. | : 13/237136 | |
| DATED | : February 11, 2014 | |
| INVENTOR(S) | : Stephen P. Lord | |

It is certified that error appears in the above-identified patent and that said Letters Patent is hereby corrected as shown below:

In the Claims:

In column 12, line 31, delete "because of the block" and insert --because the block--.

Signed and Sealed this
Twenty-first Day of October, 2014

Michelle K. Lee
*Deputy Director of the United States Patent and Trademark Office*